United States Patent

[11] 3,616,993

| [72] | Inventors | Richard McGuire<br>Smithtown;<br>John C. Maddock, Deer Park, both of N.Y. |
|------|-----------|---|
| [21] | Appl. No. | 781,197 |
| [22] | Filed | Dec. 4, 1968 |
| [45] | Patented | Nov. 2, 1971 |
| [73] | Assignee | Logic Systems, Inc.<br>Great Neck, N.Y. |

[54] NUMERICAL CONTROL SYSTEM
13 Claims, 7 Drawing Figs.

[52] U.S. Cl. ................................................. 234/17,
234/55
[51] Int. Cl. ................................................. G06k 1/02
[50] Field of Search ................................................. 234/13, 16,
17, 20, 55, 57, 58, 90, 89

[56] References Cited
UNITED STATES PATENTS

| 3,022,501 | 2/1962 | Seigle ........................... | 234/89 UX |
| 3,059,843 | 10/1962 | Corbaz ......................... | 234/58 |
| 3,122,310 | 2/1964 | Meyer ........................... | 234/89 X |
| 3,171,593 | 3/1965 | Knapp .......................... | 234/90 |
| 3,209,996 | 10/1965 | Carson et al. .................. | 234/89 X |
| 3,286,915 | 11/1966 | Davis ............................ | 234/17 |

Primary Examiner—William S. Lawson
Attorney—Ward, McElhannon, Brooks & Fitzpatrick ABSTRACT: A programming arrangement for machine tools wherein address characters are presented sequentially and call sequentially for the insertion of data, the data being registered on a block-by-block basis and transferred so as registered into a machine control logic unit; and a machine control logic unit providing automatic direction sensing, speed control, backlash and tool compensation and accurate motor drive control.

INVENTORS
RICHARD McGUIRE
JOHN C. MADDOCK
BY
Ward, McClennon, Brooks + Fitzpatrick
ATTORNEYS

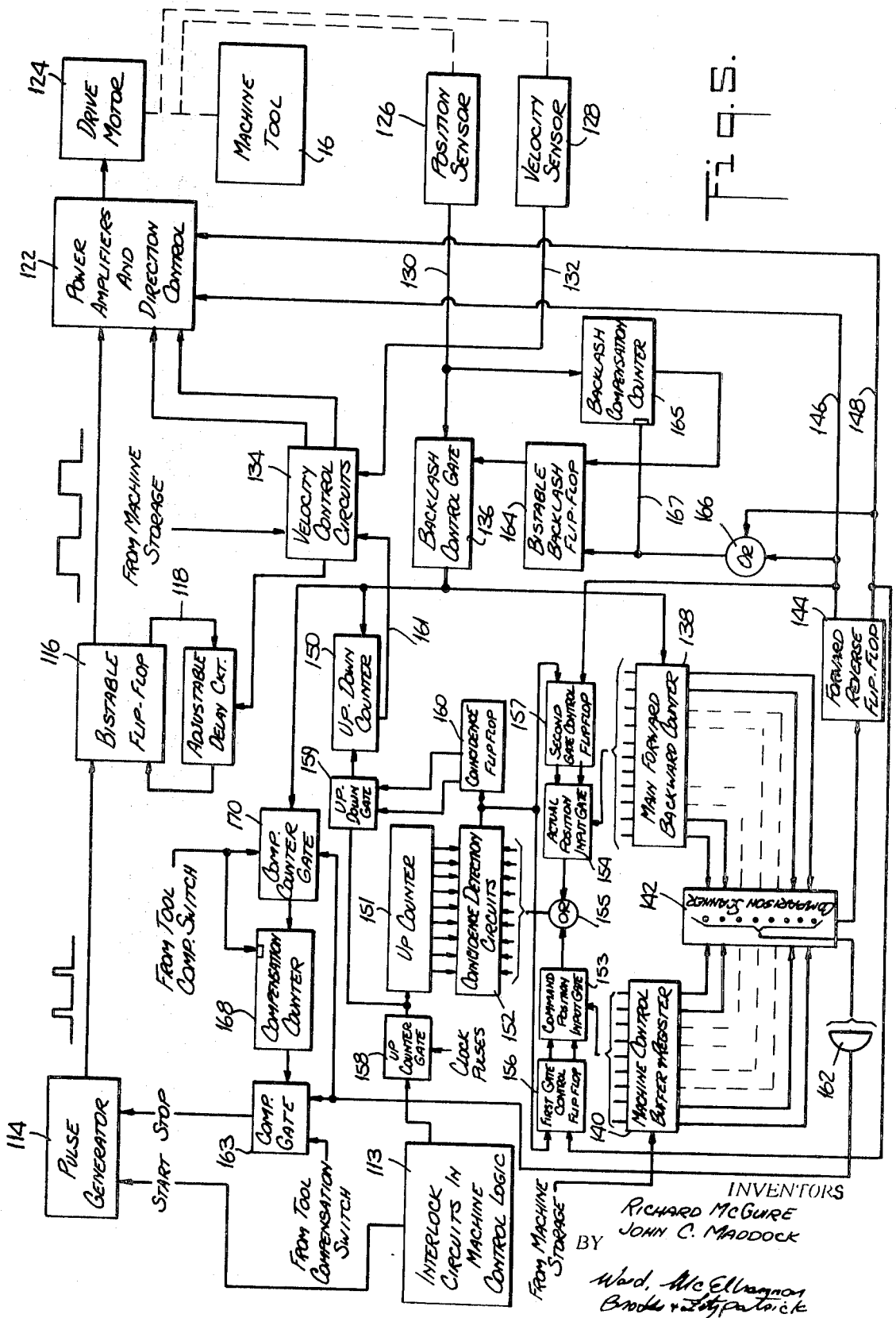

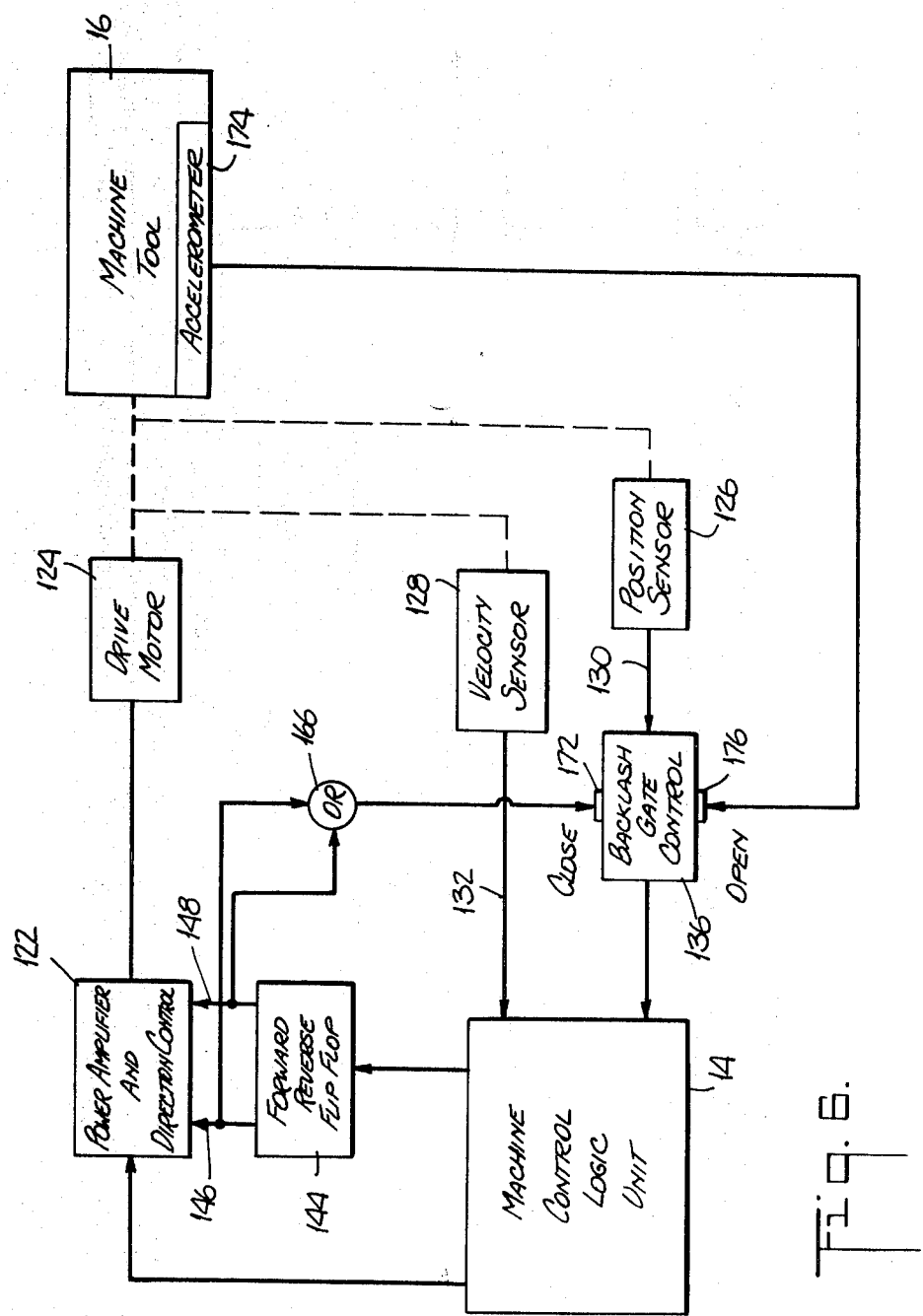

NUMERICAL CONTROL SYSTEM

This invention relates to numerical control systems and more particularly it concerns improvements which facilitate and simplify the programming and operation of such systems.

While numerical control systems are applicable to nearly every form of physical processing operation, they have found wide acceptance in the field of machine tool control. Accordingly the following description of the present invention is directed to this particular application although it will be realized by those skilled in the art that the invention may be utilized in other applications as well.

In general, a numerically controlled machine tool system employs a tape reader through which a perforated paper tape is fed. The perforations on the tape are arranged according to a coded format corresponding to the type and extent of each operation which the machine tool is to perform. When the tape is passed through the reader it causes electrical signals to be produced and these signals are used to control the different machine operations.

There are several advantages which can be realized through the use of a numerically controlled machine tool system. One of these is that a tape, once made, can be stored for reuse at a later time, thus eliminating the expense of repeated machine tool setup. Also, copies of a tape can be made and used on other similar machines. In addition, the chance of error is minimized and a more uniform product is achieved.

In spite of the above, there are certain characteristics of numerical control systems which have limited their use. One of these is that the tape must be perforated or punched according to a code which can be read and utilized by the devices controlling the machine. These codes are generally unfamiliar to machine tool setup men. On the other hand, those persons to whom such codes are familiar often do not have the experience required in machine tool operations to appreciate the limitations of the machine and its optimum operating conditions.

According to one feature of the present invention there is provided a programming arrangement for numerical control systems which does not require special knowledge in programming and programming codes. It is possible, with the present invention, for a machine tool operator easily to set up a machine program according to which the machine will operate under optimum conditions. In addition, the program can be generated simultaneously with the making of a prototype. This permits the making of modifications to the program as it is being generated, thereby saving in set up time and in wasted prototypes.

The simplified programming feature of the present invention is achieved by means of a data input arrangement which calls for and accepts program information in terms readily understandable to machine tool setup personnel. As illustratively embodied, there is provided an indicator which sequentially indicates addresses, that is, the nature of each type of data to be put into the program. When a particular address is indicated, e.g. the amount of tool bed movement in the "X" direction, then a data selector is set according to the amount of this particular movement desired. When data selection is completed an "entry" means is actuated which causes the selected data to be inserted into the program in the proper format for punching the tape. The entry actuation also serves to advance the programming in such a manner that a new address is indicated. Data for the new address can then be selected.

According to another feature of the present invention there is provided a system whereby a tape may be programmed in a manner similar to and simultaneously with the actual making of a prototype object on the machine being programmed. This allows immediate corrections and adjustments to be made to the program; and it allows the programmer to see the consequences of any steps taken in the development of a tape program.

Other aspects of the invention involve novel arrangements for the control of machine tool operations based upon the information programmed into the system. These novel arrangements include, direction sensing means, motor speed control means, backlash and tool compensation means and novel motor control circuits.

Various further and more specific objects, features and advantages of the invention will appear from the description given below, taken in connection with the accompanying drawings, illustrating by way of example preferred forms of the invention.

In the drawings:

FIG. 5 is a block diagram of a motor drive control portion of the system of FIG. 1;

FIG. 6 is a block diagram illustrating an alternate backlash compensation arrangement according to the present invention; and FIG. 7 is a circuit diagram of a portion of the motor control circuits of the present invention.

Figure 1:
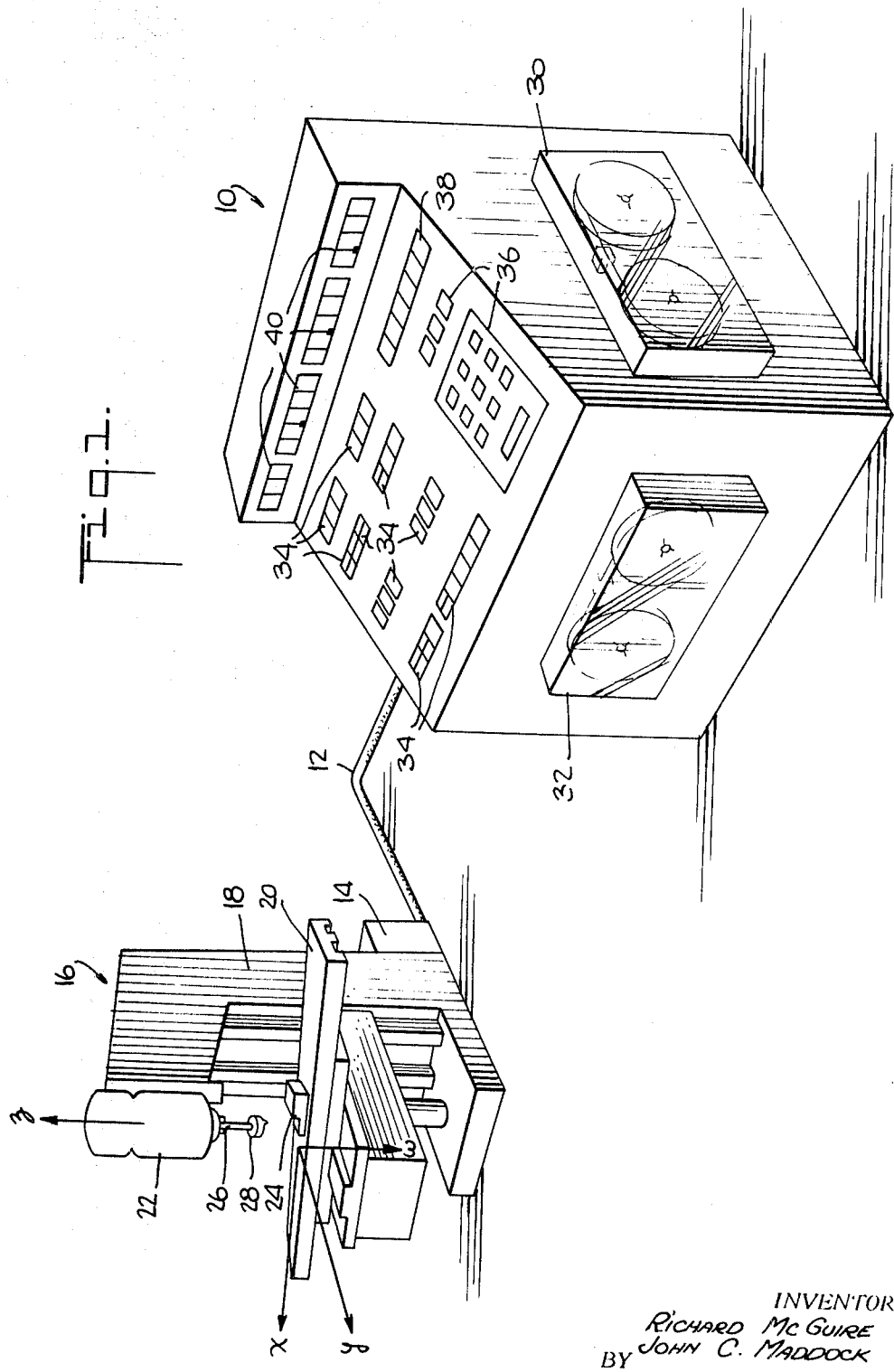
FIG. 1 is a perspective view of a machine tool and control console for a numerical control system according to the present invention.

As shown in FIG. 1 a control console 10 is connected via a cable 12 to a machine control logic unit 14 which forms a portion of a machine tool 16 such as a vertical knee mill.

The machine tool 16 includes a frame portion 18, a bed 20, and a tool drive 22. The frame portion 18 supports the tool drive 22 above the bed 20. A workpiece 24 to be operated upon by the machine tool 16 is mounted on the bed 20. The bed in turn is arranged to move the workpiece along during operation of the machine tool so that the workpiece will be machined in a desired direction and by a desired amount. Thus, as illustrated by three direction indicating arrows $x$, $y$ and $w$, in FIG. 1, the bed 20 may be moved in any desired dimension during operation of the machine tool. The bed movements are controlled in known manner by hydraulic or electromechanical drives (not shown); and the sequence, extent and speed of these movements is regulated by the machine control logic unit 14 in response to commands from the control console 10.

The tool drive 22 includes a spindle 26 on which a tool 28 is mounted. The spindle 26 rotates at a speed which is also controlled by a known drive; and the tool 28 may be moved up and down as illustrated by a direction-indicating arrow $z$ to adjust the depth of cut obtained by the tool 28.

The control console 10 performs a multiplicity of functions. First, it operates to control the machine tool 16 directly so that operations performed on the workpiece 24 may be carried out from the control console. Secondly, the control console operates to record the control information it transmits via the cable 12 to the machine control logic unit 14. This recordal is made by punching a paper tape in a tape punch unit 30 located on the side of the control console 10. Thirdly, the control console operates to control the machine tool 16 in accordance with previously prepared punched tapes. For this last function, the control console is provided with a tape read unit 32 located on the front thereof.

The top of the control console 10 includes a group of operate mode switches 34 which serve to shift the system between the above described operations. The operate mode switches also serve to establish certain operating parameters which may be common to an entire operation, for example, drive unit backlash, or the position of a dimensional reference point.

A group of button-operated manual input switches 36 is arranged next to the operate mode switches 34. The manual input switches serve to permit insertion of command data into the system. Immediately above the manual input switches is a manual input display 38 which shows each command as it is being inserted into the system.

The control console 10 is also provided with a system display 40. This display produces a running indication of each sequence in a machine tool operation along with pertinent dimensional data concerning that sequence.

Figure 2:
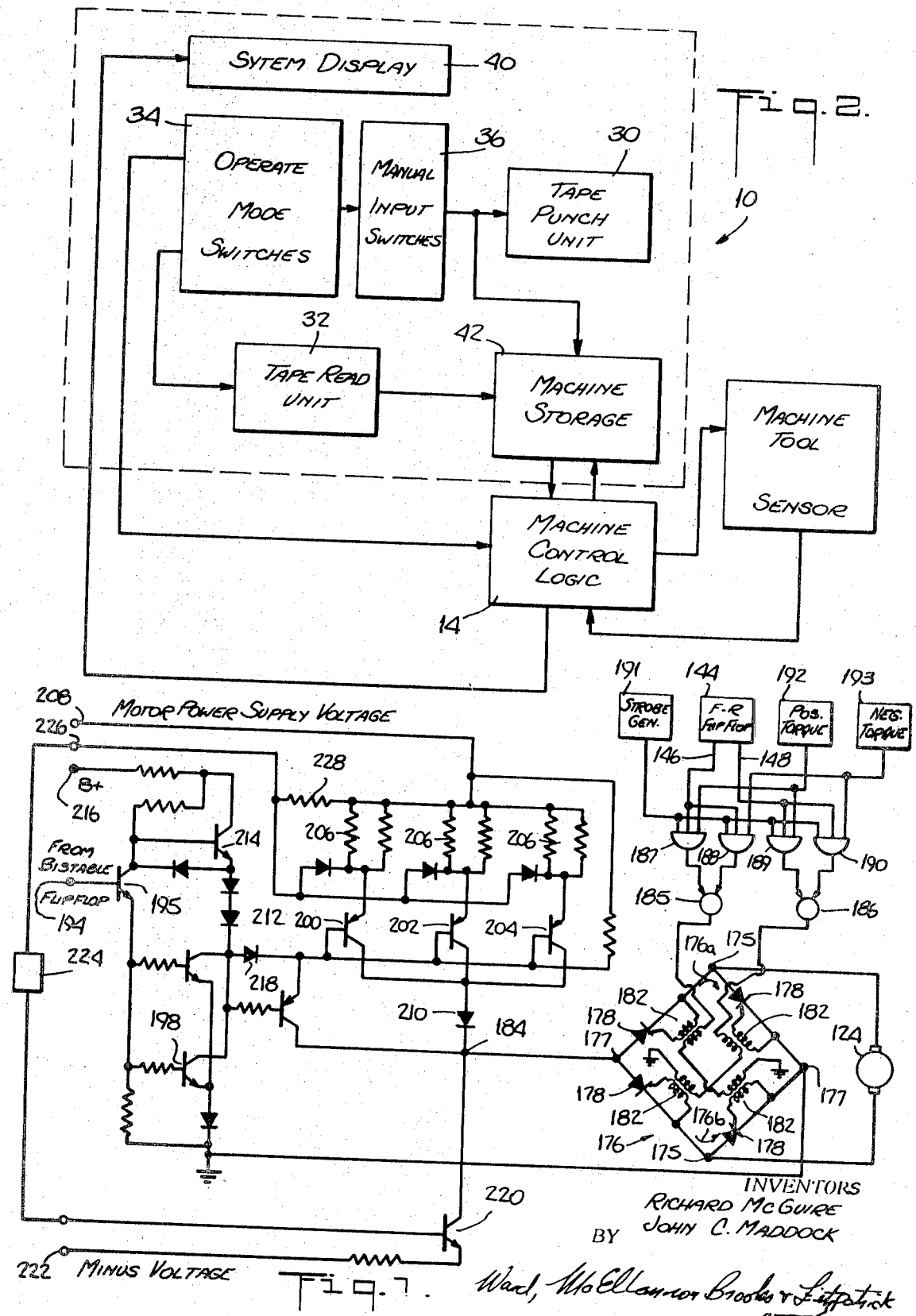
FIG. 2 is a block diagram illustrating relationships between major units in the system of FIG. 1.

FIG. 2 illustrates the functional interrelationships between the various machine tool and control console components described above. As can be seen in FIG. 2 the operate mode switches serve to enable the manual input switches 36 and the tape read unit 32. In addition, the operate mode switches control the insertion of a parameter or operating condition data into the machine control logic unit 14. The manual input switches 36, through which command data is fed to the system, transmit this data both to the tape punch unit 30 and to a machine storage unit 42. All data to the machine tool 16 passes through the machine storage unit 42. Thus the output from the tape read unit 32 is also supplied to the machine storage unit 42. The purpose of the machine storage unit 42 is to store information which is being supplied serially, i.e. in real time, and then to transfer this information on a "block" or whole operation basis to the machine control logic unit 14.

The machine tool 16 itself is provided with various sensors 44 which ascertain the actual movements, i.e. speed and distance of the machine elements being controlled. This information is passed back to the machine control logic unit 14 which compares it with the desired movements received as commands from the machine storage unit 42, and controls further movements accordingly.

The machine control logic unit 14 also operates the system display 40 so that a continuous running indication is provided of the overall machine tool operation.

Figure 3:
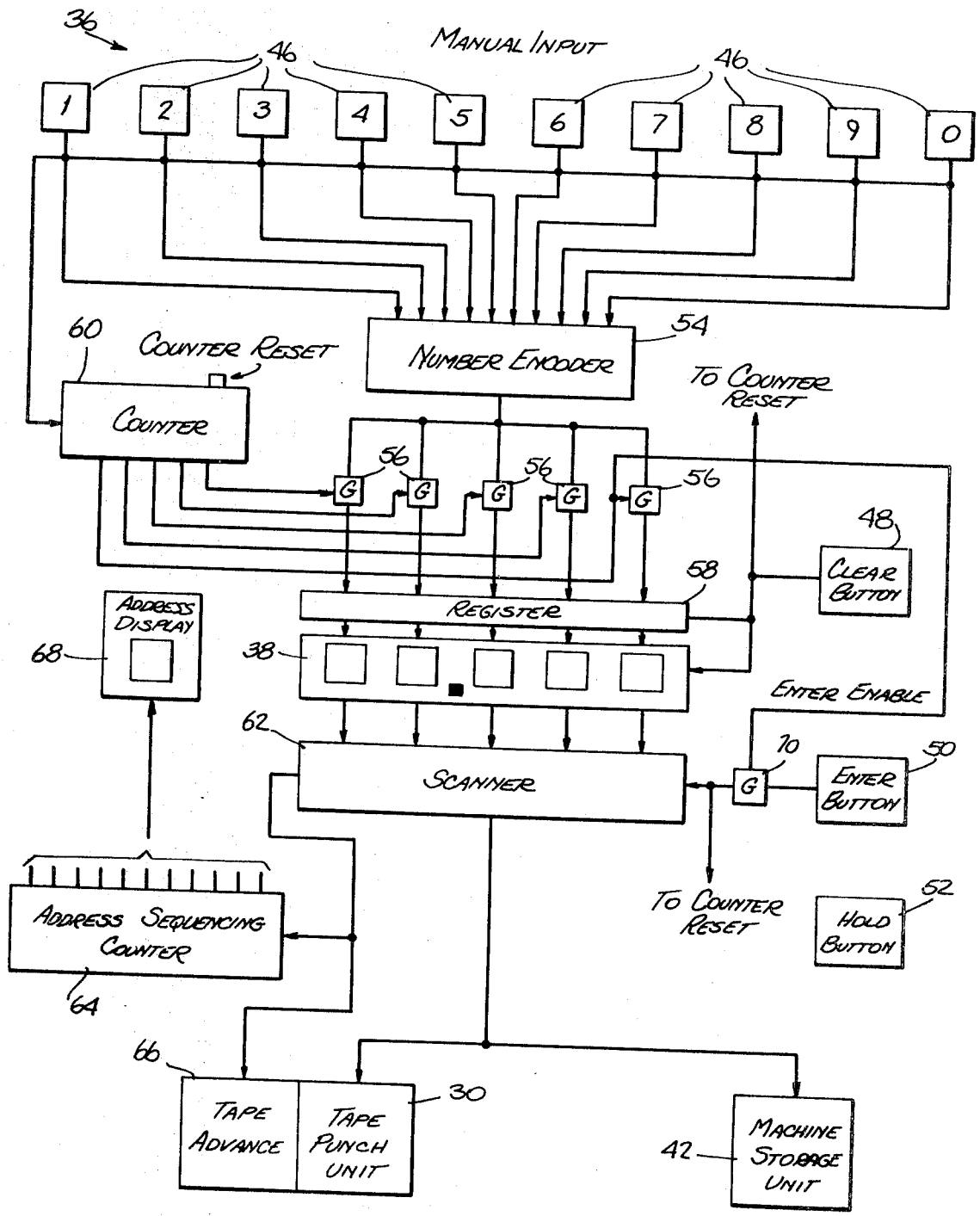
FIG. 3 is a block diagram of a manual input portion of the system of FIG. 1.

FIG. 3 illustrates the manner in which the manual input switches 36 supply command data to the tape punch unit 30 and the machine storage unit 42. Prior to discussing the structure and operation of the manual input switches however, consideration should be given to the nature of the information or data to be supplied.

In general, a machine tool operates by performing one or several cuts on a workpiece. Although multiple cuts on a given workpiece are usually performed by the machine in sequence, nevertheless each single cut requires several items of information. These items include, for example, direction of cut, distance of cut, tool speed, workpiece feed, and any special or miscellaneous functions that may be required such as coolant supply, bed clamping, rapid return etc.

In order to permit orderly control of information each of the several required items is specified for each basic operation such as a cut. The information contained in each basic operation is collectively referred to as a "block" of information; and each block is made up of a number of "addresses" representing the various items of input data to be specified for each operation or block. Each block is assigned a sequence number and the total number of sequences represents all the operations performed or to be performed by the machine tool on a given workpiece.

While some blocks in a sequence may require more, less or different addresses than other blocks, for purposes of programming the addresses in each block are arranged identically, although there may be no data for certain addresses in some blocks; or the data for an address in one block may be the same as for the same address in a previous block.

Now, in an illustrative machine tool operating sequence, the various blocks may each include the following items or addresses and associated identifying character.

| ADDRESS | Identification Character |
|---|---|
| sequence number | n |
| preparatory function | g |
| "x" dimension | x |
| "y" dimension | y |
| "z" dimension | z |
| "w" dimension | w |
| feed function | f |
| spindle speed | s |
| tool function | t |
| miscellaneous function | m |

As indicated previously, the sequence number is the number assigned to the particular block in a sequence of blocks. The preparatory function relates to special machine tool movements which are too complex to be specified conveniently in terms of $x$, $y$ and $z$ coordinates. Thus the preparatory function may be a programmed contouring function, a dwell, a hold, a thread cutting function or some other special function. The particular function desired is chosen by inserting, for the "g" or preparatory function address an input number corresponding to the function desired.

The "x," "y" and "w" addresses correspond to the distances the workpiece is to be moved relative to the tool in the $x$, $y$ and $w$ dimensions respectively. The "z" address corresponds to the distance the tool spindle is to be moved in the $z$ direction. The feed function corresponds to the speed at which the workpiece is to be moved relative to the tool. The spindle speed corresponds to the speed of rotation of the tool. The tool function corresponds to any replacements that must be made of the tool itself. The miscellaneous function corresponds to any of several preprogrammed auxiliary functions such as spindle direction, coolant control, clamping etc. Like the preparatory function, the particular miscellaneous function or combination of functions is chosen by selecting as input data, a particular number associated with the function or combination of functions desired.

It will be appreciated that for certain types of machining operations even more information may be required such as angular orientation of the workpiece about different axes, angular orientation of the spindle, multiple tool operation etc.

Because of the large amounts of information to be specified the programming operation for a machine tool can become quite complex, especially for one trained only in machine tool operations and not in computer programming. The manual input arrangement of the present invention overcomes this difficulty however, by calling for the input data to be inserted serially, although it utilizes the information simultaneously. Thus in the present arrangement, there is displayed the identification character for a particular address for which data is sought by the system. This data is punched into the manual input switches 36 and displayed. If satisfactory it is entered, and then a new identification character for the next address is displayed. This data is punched, checked and entered. The process continues until an entire block of information reaches the tape punch unit 30 and the machine storage 42. The machine storage 42 then transfers the entire block of information as a unit into the machine control logic unit 14. The thus programmed machine control logic unit 14 will then proceed to operate the machine tool 16.

Once the machine storage unit 42 has supplied a block of data to the machine control logic unit 14, it is in a position to accept new data for a subsequent block; and it can receive this information even while the machine tool 16 is operating in response to the control of the machine control logic unit 14. However, the machine storage unit 42, once filled with a block of control data, will neither accept further data nor transfer data to the machine control logic unit 14 while the latter is still controlling a machine operation. Once the operation is completed, the machine control logic unit 14 will then accept another block of information from the machine storage unit 42 to begin a subsequent operation.

As shown in FIG. 3 the manual input switches 36 include 10 numeric data buttons 46, a "clear" button 48, an "enter" button 50 and a "hold" button 52. The 10 numeric buttons which are numbered "1" through "zero," are connected to a number encoder 54. The number encoder puts out an electrical signal corresponding to the particular numeric button last pressed. These signals are fed through gates 56 to a register 58 and to the manual input display 38.

The gates 56 are normally closed but are opened sequentially by outputs from a first counter 60. The counter 60 in turn is connected to receive a signal each time one of the numeric buttons 46 is pressed. Thus as different numeric buttons are pressed, corresponding electrical signals are stored in order in the register 58 while an indication of these numbers is presented in corresponding windows of the manual input display 38.

In case the information shown on the manual input display 38 is incorrect for one reason or another, it may be erased prior to entry into the system. This is achieved by depression of the clear button 48 which clears the manual input display 38 and the register 58. It also resets the first counter 60. New information may then be entered.

If the information displayed at the manual input display 38 is proper, it is inserted into the system by depression of the enter button 50. This button is connected to activate a scanner 62 which rapidly and in sequence, samples each register position and transmits that information both to the tape punch unit 30 and to the machine storage unit 42. At the end of the scanner operation, there is produced a flyback signal; and this signal is supplied both to an address-sequencing counter 64 and to a tape advance mechanism 66. The tape advance mechanism 66 advances the tape in the tape punch unit 30 so that a new segment of the tape is provided to receive information for each address.

The address sequencing counter 64 upon receiving each flyback signal from the scanner 62 sends a different signal to an address display 68. The address display 68 is positioned adjacent the manual input display 38, and it indicates the identification character of the particular address for which information is to be inserted. Thus, the system calls for input data corresponding to the particular address character displayed and when this data is entered, the address display presents a different address character calling for other input data.

The information is thus supplied until all of the addresses in one block have been presented and data for each has been entered. Thereupon the machine storage unit 42 is enabled to transfer the data as a unit into the control logic unit 14.

In order to prevent inadvertent entry of data into the system prior to insertion of the full data for a given address, there is provided a normally closed enter gate 70 between the enter button 50 and the scanner 62. The enter gate 70 is opened by the signal which passes through the last register gate 56. Depression of the enter button 50 also resets the first counter 60, permitting it to accept data for a new address.

Reverting now to FIG. 2, it will be appreciated that the present invention permits the simultaneous programming of a punched tape and the manufacture of a prototype on the machine tool for which the program is being prepared. This is because the output of the manual input switches 36 is supplied simultaneously to both the tape punch unit 30 and to the machine storage unit 42. This arrangement is particularly advantageous for it permits program changes during the development of a prototype and allows the programmer/machine operator to see immediately the consequences of a particular set of instructions being written.

Figure 4:
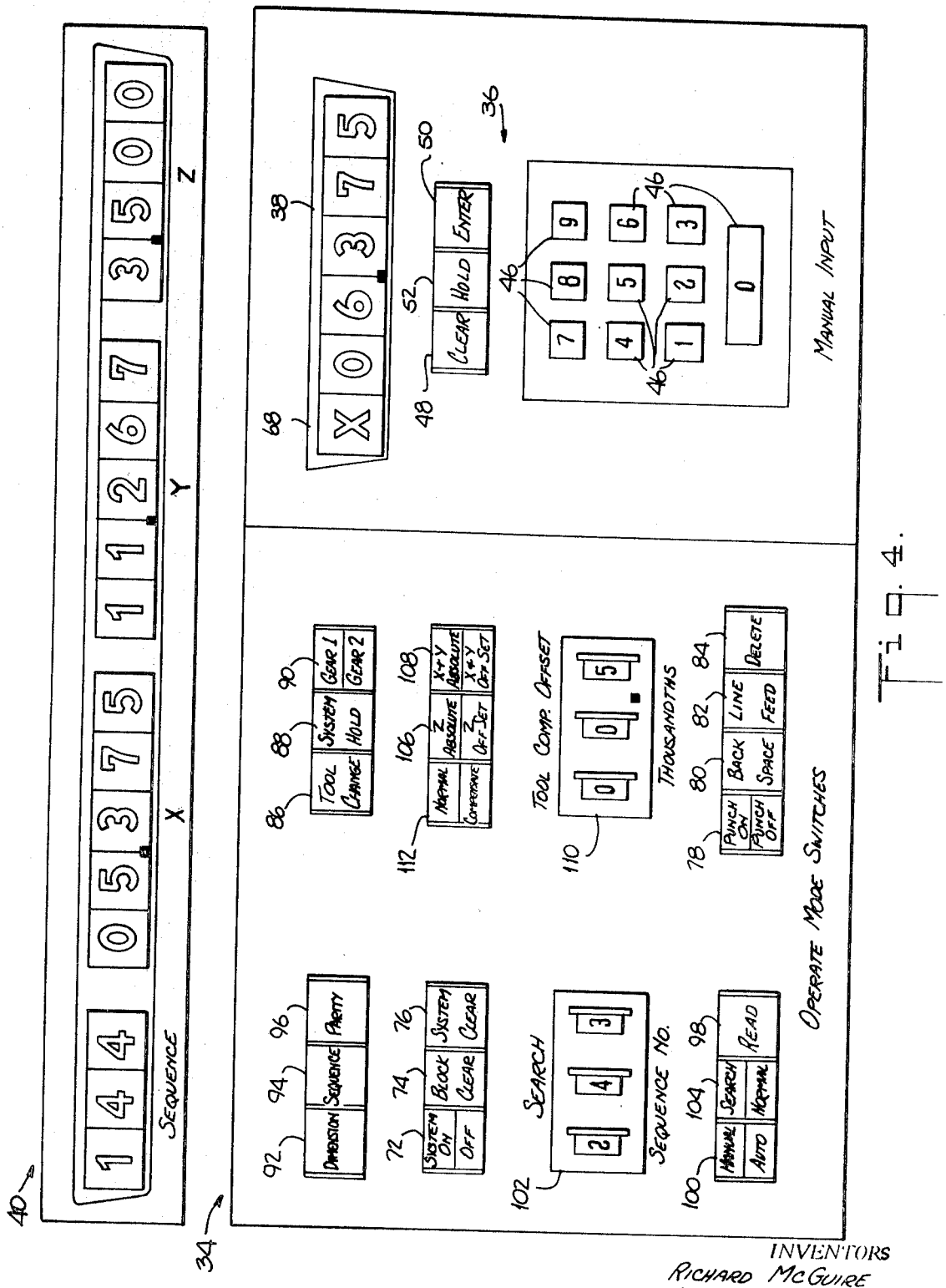
FIG. 4 is a plan view illustrating the switch button arrangement on the control console of FIG. 1.

Turning now to FIG. 4, there is shown in enlarged view the button and switch arrangement of the control console 10. Considering first the operate mode switches, it will be seen that there is provided a SYSTEM ON-OFF switch button 72 along with a BLOCK CLEAR switch button 74 and a SYSTEM CLEAR switch button 76. The BLOCK CLEAR switch button operates to clear the machine storage unit 42 of any earlier information which may have been present from earlier operations. The SYSTEM CLEAR button, on the other hand, operates to clear the entire system of previously stored information.

Initially the system is used to produce a prototype and to program a tape. For this purpose there is provided a MANUAL-AUTOMATIC switch button 78 which enables the manual input switches 36. There is also provided PUNCH ON-OFF switch 79 which controls operation of the Tape Punch Unit 30. During the course of the tape punching operation it may be necessary to back space or feed forward the tape or to delete segments of the tape. These movements of the tape in the tape punch unit 30 are controlled respectively by a BACK SPACE switch button 80, a LINE FEED switch button 82 and a DELETE switch button 84.

At various times during operation of the system interruptions in the program are required for the changing of tools, gear ratios or other reasons. For this purpose there are provided TOOL CHANGE, SYSTEM HOLD and GEAR RATIO indicator actuator buttons 86, 88 and 90. These buttons become illuminated when, during operation of the machine tool, conditions become such that a tool change, a system hold or a gear ratio change is required. At the same time the system automatically stops and the necessary adjustment or replacement is made. The illuminated button is then pressed and system operation resumes.

The system additionally provides for automatic checking of the arrangement of information punched on the tape. That is, the system checks for the proper arrangement of addresses in each block of information and at the same time it checks for proper parity of the data present in each address. When an impropriety is detected, a PARITY indicator actuator button 92, or a SEQUENCE indicator actuator button 94 will be illuminated and the system will stop until a review of the situation and any necessary correction is made. The illuminated button is then depressed to resume system operation.

Following a check of the tape, the tape is read. This function is initiated by a READ switch button 100, switching MANUAL-AUTOMATIC switch button 98 to "AUTOMATIC," and then depressing a READ SWITCH button 100.

There is also provided a DIMENSION indicator actuator switch 96 which becomes illuminated whenever the actual machine tool bed position exceeds the position commanded by the tape program, or when the bed position exceeds, for any reason, the established limits of the machine tool. When the DIMENSION indicator actuator switch 96 becomes illuminated, the system automatically stops operation. The machine and/or program is corrected, if necessary, and the switch 96 is pressed to resume operation.

In some instances it may be desired to rapidly bring the tape to a given position so that a particular sequence or block of data can be examined. For this purpose there are provided search thumbwheels 102 which can be set to any three digit number corresponding to the desired block or sequence. A SEARCH-NORMAL switch button 104 is then switched to search operation whereupon the tape is advanced to the sequence number being sought. At this point the tape may be examined or altered as desired.

During the tape reading operation, it may be necessary to insert into the system a coordinate offset to accommodate the difference between the geometric point of origin for the machine tool and the geometric point of origin for the workpiece. A Z-ABSOLUTE AND OFFSET switch button 106 and an X AND Y ABSOLUTE AND OFFSET switch button 108 are provided to shift the zero positions for the machine in the respective planes of movement.

The system also provides compensation for tool wear. In such cases, since tool wear may vary during usage, this compensation is made adjustable by means of tool compensation offset thumbwheels 110. These thumbwheels are made effective by means of a NORMAL-COMPENSATE switch button 112.

Also in a similar manner an adjustable backlash compensation is provided by a thumbwheel system (not) shown) on another part of the control console 10.

The various operate mode switches described above may be connected in any known manner to move, check and change the information stored on the programmed tapes and to augment this information as it is being read. It will be appreciated however, that by providing a console with operate mode switches in association with manual input switches it becomes possible to achieve maximum flexibility in programming with the simplicity of operation of a substantially completely programmed machine tool.

FIG. 5 illustrates diagrammatically a portion of the arrangement by which the machine control logic unit 14 operates to control dimensional movements in the machine tool 16. The machine control logic unit includes various interlock circuits 113 which determine whether the various position data are properly registered and whether the various other operations have reached a proper point to begin the dimensional movement desired. When this determination is made, the machine control logic unit applies a "start" signal to a pulse generator 114. The pulse generator, as shown, produces a series of equally spaced electrical pulses and applies them to a bistable flip-flop circuit 116. The bistable flip-flop circuit is provided with a feedback loop 118 which includes an adjustable delay circuit 120. The feedback loop is applied to another input of the flip-flop circuit 116 thereby converting it into a monostable element having a relaxation period corresponding to the setting of the adjustable delay circuit 120. The bistable flip-flop unit thus produces a series of pulses, the leading edges of which are equally spaced in time, but the widths of which vary according to the setting of the adjustable time delay circuit 120. This setting is controlled by the machine control logic unit 14 in accordance with the desired speed of dimensional movement.

The output of the bistable flip-flop circuit 116, which constitutes a duty cycle type control signal, is applied to a power amplification circuit 122 to control its output. This output is applied to a drive motor 124 which is mechanically connected to a moveable element on the machine tool 16.

Position and velocity sensors 126 and 128 are connected to the output of the drive motor 124 to produce signals representative of the amount and rate of dimensional movement in the machine tool. This information if returned, via feedback lines 130 and 132, to the machine control logic unit 14 where it is compared with the data received from the machine storage unit 42 to effect closed loop control of the drive motor 124.

The output from the velocity sensor 128 is supplied, via the velocity feedback line 132, to various velocity control circuits indicated at 134 in the machine control logic unit 14. As shown in FIG. 5, signals from the machine storage unit 42, representing a desired feed rate, are also applied to the velocity control circuits 134 and are there compared with the actual velocity represented by the signals appearing on the velocity feedback line 132. A velocity control signal is then derived and is applied to the adjustable delay circuit 120.

Position control of the machine tool movements is achieved in a somewhat similar manner. However, certain additional features are provided in association with position control: namely, direction of movement control, backlash control and tool compensation control.

Signals from the position sensor 126, which are fed back via the position feedback line 130, pass through a backlash control gate 136 and into a main forward-backward counter 138. There is also provided a machine control buffer and register 140 which receives position information from the machine storage unit 42. The signals present in the main forward-backward counter 138 and in the machine control buffer and register 140 are arranged in order of significance of digits. The value of the digits of each digit position in these two components are transmitted to corresponding positions in a comparison scanner 142. The comparison scanner operates to compare the values of the digits supplied from the main forward-backward counter 138 and the machine control buffer and register 140, beginning with the most significant digit and working toward the least significant digit. When an inequality is noticed in this comparison, a signal is generated corresponding to which of the compared signals is the greater. This signal is then supplied to a forward-reverse flip-flop circuit 144. Thus, where the number stored in the machine control buffer and register 140 is greater than that stored in the main forward-backward counter 138, the forward-reverse flip-flop 144 will be switched to produce a signal on a forward control output line 146. However, where the number stored in the main forward-backward counter 138 is greater than that stored in the machine control buffer and register 140, the comparison scanner 142 will signal the forward-reverse flip-flop 144 to change state so as to produce a signal on a reverse control output line 148. The signals from the forward and reverse control output lines 146 and 148 are supplied to the power amplification unit 122 to control the direction of movement of the drive motor 124 accordingly. The manner in which this occurs will be described more fully in connection with FIG. 7.

In order to insure that the positional movements in the machine tool 16 are terminated at a precise location and that overshooting of the desired final position is avoided, or reduced to a minimum, it is necessary to slow down the drive motor 124 as the actual position of the bed or other moving element in the machine tool approaches its final desired position. For this purpose there is provided a system for signalling when the actual position of the bed or other element with within a given distance from the commanded position. The signal is applied to the velocity control circuits which in turn reduce the speed of the drive motor 124 in a manner to be explained.

The position signalling system includes an up-down counter 150, an up counter 151 and coincidence detection circuits 152. The signals stored in the machine control buffer and register 140 and the main forward-backward counter 138, which represent respectively, the commanded position and the actual position of the machine tool bed or other moveable element are applied respectively via a command position input gate 153 and an actual position input gate 154 to a common OR-gate 155 and from there to the coincidence detection circuits 152. The command position input gate 153 and the actual position input gate 154 are opened at alternate times so that at any instant the coincidence detection circuits 152 receive the accumulated signals from either the machine control buffer and register 140 or the main forward-backward counter 138.

The gates 153 and 154 are controlled respectively by first and second gate control flip-flops 156 and 157, and these in turn are controlled by the outputs of the forward-reverse flip-flop 144 and by an output from the coincidence detection circuits 152.

The coincidence detection circuits 152 also receive signals to be compared from the up counter 151. This in turn receives clock pulses from a source (not shown). The clock pulses pass through an up counter gate 158 which receives signals from the interlock circuits 113. The clock pulses are also applied via an up-down gate 159 to the up-down counter 150. The up-down gate is opened and closed by the outputs of a coincidence flip-flop 160 and this in turn is actuated by outputs from the coincidence detection circuits 152.

In operation of the above described portion of the system the comparison scanner ascertains which of the machine control buffer and register 140 and the main forward-backward counter 138 has the smaller count. The forward-reverse flip-flop 144 is actuated accordingly and produces an output signal which operates either the first or second gate control flip-flop 156 or 157 so that the associated input gate 153 or 154 will be opened. The signals from either the machine control buffer and register (representing commanded position) or from the main forward-backward counter (representing actual position) are then applied to the coincidence detection circuits 152.

At this time a signal from the interlock circuits 113 opens the up counter gate 158 and allows clock pulses to accumulate in the up counter 151. When the coincidence detection circuits 152 detect that the count in the up counter 151 has reached a value equal to that being applied to the coincidence detection circuits either from the machine control buffer and register 140 or from the main forward-backward counter 138 the coincidence detection circuits 152 will produce a first output to switch the coincidence flip-flop circuit. This in turn will open the up-down gate 159 and allow subsequent clock pulses to enter the up-down counter 150. This first output from the coincidence detection circuits 152 is also applied to the first and second gate control flip-flops 156 and 157, causing them to change the condition of the command position input gate 153 and the actual position input gate 154. This serves to switch the application of signals to the coincidence detection circuits 152 from the register or counter containing the larger signal. The up counter 151 continues to accumulate clock pulse counts and at the same time clock pulse counts are also supplied to the up-down counter 150, since the up-down gate 159 is caused to be opened by action of the coincidence flip-flop 160 when the first coincidence is detected in the coincidence detection circuits 152.

The clock pulses to the up counter 151 and the up-down counter 150 continue until the coincidence detection circuits 152 sense a coincidence between the count accumulated in the up counter 151 and the signal being applied from the machine control buffer and register 140 or the main forward backward counter 138. When this second coincidence occurs a second output is generated by the coincidence detection circuits 152 and the coincidence flip-flop 160 is switched to close the up-down gate 159.

It will be appreciated that the up-down gate 159 is opened to receive clock pulses when the up counter 151 has a count equal to that of either the machine control buffer and register 140 or the main forward-backward counter 138, whichever has the lowest count; and the up-down gate 159 closes when sufficient additional clock pulses have been generated to cause the accumulated count in the up-down counter 150 to equal the larger signal in either the machine control buffer and register 140 and the main forward-backward counter 138. Thus the up-down counter accumulates a count corresponding to the difference between the counts in the machine control buffer and register 140 and in the main forward-backward counter 138. This count represents the dimensional difference between where the machine bed or other moveable element actually is and where it is commanded to be by the signals in the machine control buffer and register 140.

When the up-down counter 150 has been thus programmed, the interlock circuits 113 issue a start signal to the pulse generator 114 to begin operation of the drive motor 124. The motor 124 drives the moveable element on the machine tool 16 and as it does so the position sensor 126 generates signals causing the counts in both the main forward-backward counter 138 and in the up-down counter 150 to be changed. When the moveable element attains its commanded position the counts in the main forward-backward counter 138 and in the machine control buffer and register 140 will be equal and the count in the up-down counter 150 will be zero.

The up-down counter 150 is provided with a slowdown command output line 161 which produces a signal when the count in the up-down counter reaches a certain level representing a given displacement between the commanded and the actual positions of the moveable machine tool element. This signal is applied to the velocity control circuits 134. The velocity control circuits respond to this signal to initiate a programmed motor slowdown.

When the moveable element has reached its commanded position the signals present in the machine control buffer and register 140 and in the main forward-backward counter 138 will be equal. This equality is detected in the comparison scanner 142 by means of an AND-circuit 162. The AND-circuit 162, upon receiving coincidence signals from each of the positions in the comparison scanner 142, produces an output which is supplied via a compensation gate 163 to a STOP terminal in the pulse generator 114. This signal terminates the output from the pulse generator, thereby stopping the drive motor 124.

In order to achieve backlash control there is provided in association with the backlash control gate, a bistable backlash flip-flop 164 and a backlash compensation counter 165. The problem of backlash occurs only when the drive motor 124 undergoes a change in direction, since it is only at this time that different faces of gear teeth or drive chain elements must come into contact with each other. Accordingly, there is provided an OR-gate 166 which receives outputs from the forward and reverse control output lines 146 and 148 to produce a signal whenever a change in direction of the drive motor 124 is called for. The signal from the OR-gate 166 is applied to the bistable backlash flip-flop 164 causing its output to close the backlash control gate 136. This inhibits signals from the position sensor 126 from being applied to the main forward-backward counter 138. However, the signals from the position sensor 126 are at this time applied to the backlash compensation counter 165. The capacity of the backlash compensation counter 165 is prearranged to receive a number of counts corresponding to the amount of backlash present in the system. When this number of counts is attained, an output is produced by the backlash compensation counter 165 and this signal is applied to the bistable backlash flip-flop 164 changing its output to reopen the backlash control gate 136. Thereafter further signals from the position sensor 126 are allowed to enter the main forward-backward counter 138. In order to insure that the backlash compensation counter will account for the full number of counts corresponding to the backlash which occurs for each change of direction, a reset connection 167 is provided to reset the backlash compensation counter 165 each time an output is produced by the OR-gate 166.

The above-described backlash control arrangement thus allows the drive motor 124 to drive for a certain length of time without signals being applied to the main forward-backward counter 138. This length of time corresponds to the distance represented by the backlash present in the gears, chain drive, etc., in the machine tool 16 itself. Once this backlash distance is overcome, the system reverts to normal operation whereby the outputs from the position sensor 126 are applied to the main forward-backward control counter 138.

The machine tool control system of the present invention additionally permits accommodation for the wear which takes place along the cutting edges of tools and changes the actual cut dimensions for each given tool position. To this end, there is provided a compensation counter 168 and a compensation counter gate 170. When compensation is desired, an instruction, in the form of an "$m$" code, is entered, either manually or automatically. Receipt of this "$m$" code instruction by the system serves to stop the machine tool 16 and inform the operator by illuminating the COMPENSATE indicator actuator button 112 (FIG. 4). The operator answers by depressing the button 112 and thereby enables machine movement. This movement continues until a coincidence is detected in the signals present in the machine control buffer and register 140 and the main forward-backward counter 138 (FIG. 5). At this time the compensation counter gate 170 is opened thereby allowing further signals from the position sensor 126 to be applied to the compensation counter 168. The compensation counter 168 continues to receive position information from the sensor 126 until it has counted back from its preset number to zero at which time the machine is stopped as in normal operation. The capacity of the compensation counter 168 is adjusted to correspond to the desired amount of tool compensation. When the position sensor 126 has produced a number of pulses corresponding to the movement required for this amount of compensation, the compensation counter 168 produces an output which is applied to open the compensation gate 158. This allows the output of the stop level detector 156 to be applied to the stop terminal of the pulse generator 114 thereby permitting the signals to the drive motor 124 to terminate.

It will be appreciated that the compensation arrangement described above permits the drive motor 124 to drive the moveable element, e.g. the bed 20 of the machine tool, beyond its normal programmed position by an amount corresponding to the capacity of the compensation counter 168, this amount corresponding to the degree of tool compensation required.

FIG. 6 shows, in diagrammatic form, an alternate arrangement for achieving backlash compensation. In FIG. 6, as in the previously described embodiment of FIG. 5, the machine control logic unit 14 provides duty cycle type input control to the power amplifier unit 122. At the same time it provides direction control via the forward-reverse flip-flop 142 and the forward and reverse control output lines 146 and 148. In addition, the power amplifier circuits 122 control the drive motor 124 which in turn drives the moveable element in the machine tool 16. As in the previous embodiment, the movements of the drive motor 124 are sensed by means of a position sensor 126 and a velocity sensor 128; and the outputs of these devices are fed back along position and velocity feedback lines 130 and 132. There is also provided, as in FIG. 5, a backlash control gate 136 in the position feedback line 130. This backlash control gate however is controlled in a somewhat different manner. Each time a direction reverse condition is called for by the forward-reverse flip-flop 144, a signal will appear at the output of the OR-gate 166 and will be applied to a close terminal 172 of the backlash control gate 136. Position signals from the drive motor 124, as produced by the position sensor 126, will be inhibited from being applied to the machine control logic unit 14. However, when the backlash present in the machine tool 16 has been overcome and the machine tool bed or other moveable element therein beings to move, such movement will be detected by means of an accelerometer 174 mounted on the moveable element of the machine tool. The accelerometer output is applied to a gate opening terminal 174 of the backlash control gate 136. This will allow the gate to open and permit signals from the position sensor 126 to be applied to the machine control logic unit 14.

It will be appreciated that this second arrangement operates independently of the amount of backlash present in the system and automatically compensates for any change in backlash which may occur.

FIG. 7 shows in schematic form the power amplification circuits for controlling the speed and direction of the drive motor 124. As shown in FIG. 7 the drive motor 124 is connected across a pair of output terminals 175 of a switching bridge circuit 176. The bridge circuit 176 comprises separate branches connecting each of the output terminals 175 with each of a pair of input terminals 177. Each branch contains a rectifier 178 on each side of the output terminal 175; and all the rectifiers are arranged to allow current flow in the same direction between the input terminals 177. As shown, all of the rectifiers 178 are thyristors. Each thyristor's gate terminal is connected to the secondary of an associated switching transformer 182. The input terminals 177 of the rectification bridge circuit 176 are connected respectively to ground and to a power supply terminal 184 of the amplification portion of the power amplification unit 122.

It will be noted that the switching transformers 182 are connected together in pairs, each pair comprising the switching transformers for the thyristors 178, in different branches and on opposite sides of the output terminals 175 of the rectification bridge circuit 176. Each pair of mutually connected switching transformers 182 is arranged to receive signals via associated forward and reverse OR-gate circuits 185 and 186.

The forward OR-gate circuit 185 receives signals from a first pair of torque control AND-gate circuits 187 and 188 while the reverse OR-gate circuit 186 receives signals from a second pair of torque control AND-gate circuit 189 and 190. The first and second pairs of torque control AND-gate circuits 187, 188 and 189, 190 receive signals from a strobe generator 191, the output lines 146 and 148 of the forward-reverse flip-flop circuit 144 and from positive and negative torque control terminals 192 and 193 in the velocity control circuits 134. As shown in FIG. 7 the strobe generator 191, which produces a series of rapid accurately spaced pulses, is applied to one input of each of the AND-gate circuits 187, 188, 189 and 190. The forward control output line 146 of the forward reverse flip-flop 144 is connected to one input of each of the first pair of AND-gate circuits 187 and 188 while the reverse control output line 148 is connected to one input of each of the second pair of AND-gate circuits 189 and 190. The positive torque terminal 192 is connected to an input of one of the AND-gate circuits in each pair, i.e. the circuits 187 and 189, while the negative torque terminal 193 is connected to an input terminal of each of the remaining AND-gate circuits 188 and 190.

It will be appreciated from the above that the thyristors 178 will fire whenever the transformer 182 to which they are connected receives a signal from its associated forward or reverse OR-gate circuit 185 or 186. These in turn require a coincidence of signals at one of the associated torque control AND-gate circuits 187, 188, 189 or 190. The inputs to the torque control AND-gate circuits are such that only one of these circuits will produce outputs to their associated forward or reverse AND-gate circuit 185 or 186 at any given time.

The forward OR-gate circuit 185 will produce output signals to its associated transformers 182 to switch the associated thyristors 178 for causing forward current to flow through the drive motor 124 whenever there is a coincidence of signals from the strobe generator 191, the forward control output line 146 and the positive torque terminal 192. The forward OR-gate circuit 185 will also produce output signals when there is a coincidence of signals from the strobe generator 191, the reverse control output line 148 and the negative torque terminal 193.

The reverse OR-gate circuit 186, on the other hand, will produce outputs to its associated transformers 182 to switch the associated thyristors 178 for directing reverse current through the drive motor 124 whenever there is a coincidence of outputs from the strobe generator 191, the reverse control output line 148 and the positive torque terminal 192 or whenever there is a coincidence of outputs from the strobe generator 191, the forward control output line 146 and the negative torque terminal 192.

Direction of current flow through the motor 124 is thus controlled by the combination of outputs from the forward and reverse output lines 146 and 148 and the positive and negative torque terminals 192 and 193. When the motor 124 is to be driven forwardly, signals will be applied on the forward control output line 146 and the positive torque terminal 192. However, should motor speed become excessive a signal will appear on the negative torque terminal 193 and this will reverse the direction of current flow through the motor by switching on different thyristors 178. Similarly, when the motor 124 is to be driven in reverse, signals will be applied on the reverse control output line 148 and on the positive control output terminal 192. However, should motor speed become excessive, a signal will appear on the negative torque terminal 193 and this also will reverse the direction of current flow.

Turning now to the power amplification portion of the power amplifier unit 122, it will be seen that there is provided an input terminal 194 which receives signals from the bistable flip-flop circuit 116 of the machine control logic unit 14. This signal is applied to the base terminal of a first input transistor 195. When ground potential is applied to the input terminal 194, the first input transistor 195 is placed in cutoff condition and as a result, ground potential is applied to the base terminals of second and third input transistors 196 and 198 thus maintaining these transistors also in cutoff condition. The first, second and third input transistors 195, 196 and 198 are all of the NPN variety.

The collector of the second input transistor 196 is connected to the base terminals of three power transistors 200, 202 and 204. These power transistors are of the PNP variety. Their emitters are connected via resistance networks 206 to a main power supply voltage terminal 208. The collectors of the power transistors 200, 202 and 204 are all connected via a common diode 210 to the power supply terminal 184.

The collector terminals of the second and third input transistors 196 and 198 are connected via a pair of input diodes 212 and through the emitter and collector terminals of the fourth input transistor 214 to a B+ voltage supply terminal 216.

The duty cycle type control input signal from the bistable flip-flop 116 shifts between ground potential and a positive voltage. When ground potential is applied at the input terminal 194, this maintains the first input transistor 195 at cutoff condition thereupon maintaining a ground potential at the base terminals of the second and third input transistors 196 and 198 so that they are maintained also in cutoff condition. However, at this time positive voltage is applied via the B+ supply terminal to both the base and collector terminals of the fourth input transistor 214, thereby maintaining it in conducting condition. The voltage at the emitter of the fourth input transistor 214 is thus at a positive potential; and this positive potential is applied through a further diode 216 to the base terminals of the first, second and third power transistors 200, 202 and 204 to maintain these transistors in cutoff condition.

When the potential at the input terminal 194 raises to a positive level, this results in the placing of the first input transistor 195 into conducting condition. Consequently the voltage applied to the base terminals of the second and third input transistors 196 and 198 is raised, allowing these transistors to be rendered conductive. When these transistors conduct, the voltage at their collector terminals decreases, and this decreasing potential is applied, via the diode 216, to the base terminals of the power transistors 200, 202 and 204. As a result, the power transistors themselves are placed into conduction so that their collector voltage, and consequently the voltage at the power output terminal 184, is raised. It will thus be seen that the voltage changes at the power supply terminal 184 follow the voltage variations at the input terminal 194. Thus, the signals at the input terminal 194 control the application of power supplied from the power supply terminal 184 to the rectification bridge circuit 176 and to the drive motor 124.

It will be noted that the mere application of voltages to the rectification bridge circuit 176 via the power supply terminal 184, does not by itself cause the bridge circuit to supply power to the drive motor 124. It is only when certain of the thyristors 178 are fired by signals from the strobe generator 191 that any current will be allowed to pass through the bridge circuit 176. The purpose for this is to permit an interval of time to occur between the time that the power transistors 200, 202 and 204 are rendered conductive so that these transistors may be brought up to full saturation or conduction conditions before any current drain via the rectification bridge 176 is allowed. In addition, the output of the main power supply is rendered more precise by the action of the strobe generator 191.

A clearing transistor 220 is connected between the power output terminal 184 and a minus voltage terminal 222. The clearing transistor 220 is normally maintained in a nonconducting state by means of the output from a differential amplifier 224. The differential amplifier 224 in turn receives signals via a clamp sense terminal 226 and a clamp sense resistor 228, which indicates the presence or absence of current flow in the resistance networks 206. When the power transistors 200, 202 and 204 are turned off, current ceases to flow in the resistance networks 206; and this information is detected and applied to the differential amplifier circuit 224 which responds by increasing the potential at the base terminal of the clearing transistor 220, thereby placing it into a conducting condition. This has the effect of lowering the potential at the power supply terminal 184 to a negative value. The purpose for this is to remove any residual positive potential which may have been present in the bridge circuit 176 and have maintained some of the thyristors 178 in their conducting conditions. In other words, the effect of the clearing transistor 220 is to ensure that at the time the power transistors 200, 202 and 204 cease to supply current to the bridge circuit 176 that that circuit will cease producing current to the drive motor 124. This ensures that the drive motor will be stopped at a precise location and at the same time it enables a rapid reversing to take place of the drive motor.

The present invention provides a unique advance in electrical drive controls which enables the application of very high speed computer data to such controls. Difficulties have been experienced in the past in obtaining motor control responses which matched the speed of the computer processed motor commands. This was because the motor drive currents were quite large compared to the currents involved in the data or control signals; and the switching and amplification of these currents required time to bring transistors and other electrical elements up to saturation.

In the present case however the current amplification portion of the motor drive system is made separate from the current switching portion. The switching, which produces current reversal through the motor, can be carried out at very high speed and does not depend upon the amplification of current as in prior systems. This high-speed switching moreover can be used to obtain very precise control of motor speed since reverse current can be applied quickly and for precisely controlled durations when an overspeed condition is detected.

What is claimed and desired to be secured by Letters Patent is:

1. A numerical control system for programming a machine which utilizes several instructions simultaneously, said system comprising a machine data storage unit capable of storing at the same time several groups of signals, each group representing one of said several instructions, when said groups are presented to said storage unit in a given sequence, signal generator means capable of producing individual signals corresponding to individual commands making up said instructions, means for entering the output of said signal generator means into said machine data storage unit and means responsive to the entry of each group of signals from said generator means into said storage unit to identify the following signal group in said given sequence.

2. A numerical control system according to claim 1 and further including means for indicating the commands selected for each instruction in advance of operation of said means for entering the output.

3. A numerical control system according to claim 1 and further including means for clearing undesired command signals from said signal generator means prior to operation of said means for entering the output.

4. A numerical control system according to claim 1 wherein said signal generator means includes means for serially generating signals corresponding to each command on a digit by digit basis.

5. A numerical control system according to claim 1 further including means operative to inhibit operation of said means for entering the output prior to generation of signals for a complete instruction.

6. A control system according to claim 1 wherein said signal generator means includes a register for accumulating each of the signals in one group and means for entering the signals into the register in serial manner.

7. A control system according to claim 6 wherein said means directing the output of said signal generator means comprises scanner means operative to scan and register and transmit the scanned signal information in said register to said machine data storage unit.

8. A control system according to claim 7 wherein said means responsive to the entry of each group of signals comprises an address sequencing counter responsive to successive input signals to produce different signals representative of a new address, indicator means responsive to said different signals to produce corresponding different address indications and means supplying input signals to said address sequencing counter in response to the completion of each operation of said scanner means.

9. A control system according to claim 1 wherein said system includes a record making means operative to record the signals from said signal generator.

10. A control system according to claim 9 wherein said record making means is operative to record said signals across a segment of a recording medium and wherein said record making means is operative to advance said medium to a new segment in response to the entry of each group of signals from said generator means into said storage unit.

11. A numerical control system according to claim 1 further including a machine control logic unit connected to receive said several groups of signals simultaneously from said storage unit.

12. A numerical control system according to claim 11 wherein said machine control logic unit is operative to inhibit transfer of signals from said storage unit during machine operation.

13. A numerical control system according to claim 12 wherein said storage unit is operative to receive further groups of signals during machine operation.